No. 872,287. PATENTED NOV. 26, 1907.
G. N. KINNELL.
OVERSHOE FOR HORSES.
APPLICATION FILED MAR. 25, 1907.
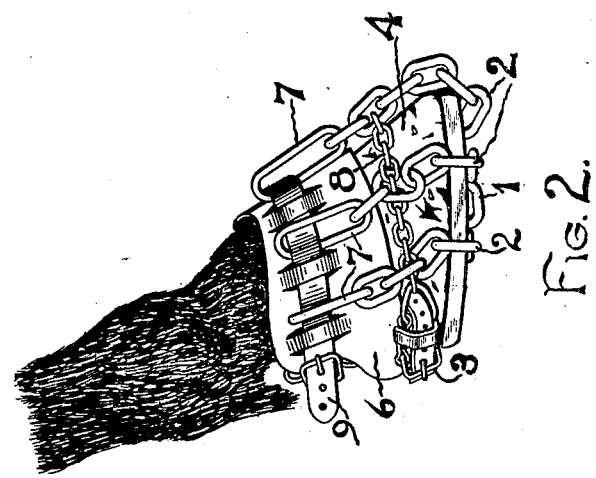
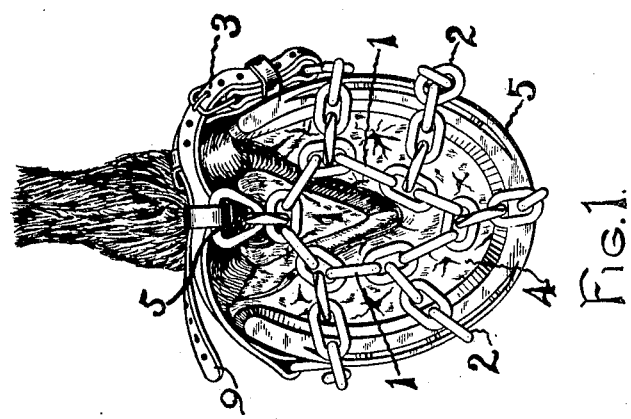
INVENTOR.
George N. Kinnell.

UNITED STATES PATENT OFFICE.

GEORGE N. KINNELL, OF PITTSFIELD, MASSACHUSETTS.

OVERSHOE FOR HORSES.

No. 872,287.   Specification of Letters Patent.   Patented Nov. 26, 1907.

Application filed March 25, 1907. Serial No. 364,413.

*To all whom it may concern:*

Be it known that I, GEORGE N. KINNELL, a citizen of the United States, residing at Pittsfield, in the county of Berkshire and Commonwealth of Massachusetts, have invented new and useful Improvements in Overshoes for Horses and other Draft and Burden-Bearing Animals, of which the following is a full and complete specification, such as will enable those skilled in the art to which it appertains to make and use the same.

This invention relates to hoof-attachments for horses and other draft and burden bearing animals for the prevention of slipping in travel over ice, asphalt or other smooth surfaces. And one object thereof is to provide an improved device comprising a rough and durable medium, interposed between the hoof and the ground, which may be securely attached to the foot and easily removed at pleasure; and a further object .ing to provide a medium of the character described which shall readily tend to impress the surface trod upon but which shall not wear to a smooth surface nor accumulate thereon any considerable quantity of snow or ice.

With these and other objects in view my invention consists of an overshoe constructed as hereinafter described and claimed, and is fully disclosed in the following specification, of which the accompanying drawings form a part, corresponding parts being designated by similar reference characters in each of the views, and in which,—

Figure 1 is a perspective bottom view of the hoof showing my device applied thereon, and Fig. 2, a perspective side view of the same.

In the construction of my invention I provide a plurality of intercepting metallic links sufficient in size, strength and number to form a firm and durable tread intervening between the hoof and the ground, said links being preferably formed into chain-like strands or catenations, 2—Figs. 1 & 2, radiating or diverging from a common locus, located centrally of the underside of the hoof, and extending outward and upward closely following the contour of the hoof. The converging ends of the strands 2, as shown in Fig. 1, are movably attached to a common center ring or chain, 1—Fig. 1, composed of one or more links. The di- verging ends of the strands 2, Fig. 2, are extended upward, the rear strand passing over the frog of the foot being excepted, to the upper margin of the hoof and provided terminally with elongated links, 7—Fig. 2, suitable for the reception of a flat band, 9, composed of leather or other suitable substance, passed therethrough; said band, 9, being provided terminally with a buckle and secured closely about the circumference of the leg at the said upper margin of the hoof. The said diverging ends of the several strands 2, Fig. 2, are held in position by means of a medial band, 8, composed preferably of intercepting metallic links of lighter construction, passed crosswise thereto and circumferentially of the hoof, between the lower margin thereof and the band 9; the links composing the band 8 being enlinked with those of the strands 2 at the several points of contact therewith. The said band 8 is provided terminally with a buckle, 3, Fig. 2, and strap, similarly to band 9, adapted to draw the band 8 closely about the hoof and to secure the ends thereof firmly together under the heel of the foot. The hindmost of the strands 2, as shown in Fig. 1, which is adjusted to pass under the frog of the foot, is extended upward only to a point free from contact with the ground and is provided terminally with a metallic link, 5, Fig. 1, adapted to engage with a looped hasp, of leather or other suitable material, engaging with and depending from band 9; said hasp being also adapted to engage with and support the said terminal strap of band 8. A protective shield, 6, Fig. 2, composed of leather or other pliable substance, is provided to incase the extremity of the leg and the upper margin of the hoof, and is held in position under the metallic links 7 of the strands 2 by means of the band 9; the said band being interwoven with the said shield by means of slot-openings provided circumferentially therein at predetermined points.

It will be apparent that the size, number and strength of the strands 2 may be increased or diminished; that other means than a central link or chain, 1, may be substituted for securing the converging ends of the said strands; and that connected links, moving relatively to each other and interposed between the foot and the ground, may be altered in size, shape and number, or differently constructed and disposed, without departing from the spirit of my invention.

My device is adjusted and operated as follows:—The buckles provided terminally on the bands 9 and 8 are unloosed, thus allowing the free ends of the shield 6 to expand for the admission of the foot. The overshoe when placed upon the hoof is so adjusted by the operator that the central link or chain, 1, is placed centrally of the underside of the hoof, and the strands 2, divergent therefrom, spaced uniformly apart so as to insure stability and firmness of treading-surface, while the hindmost strand is adjusted to engage with the vertical recess normally formed in the heel of the foot. The free ends of the shield, 6, are then brought together and overlapped and the band 9 securely buckled in such manner as to prevent the said shield from slipping down. The band 8 is then drawn tightly about the hoof and base of the heel by means of the buckle 3 to insure against disarrangement of the several strands 2 from their original positions.

My improved overshoe is simple in construction, practicable in form and possesses a combination of merits not heretofore devised or claimed in any single instance.

Having fully described my invention I claim as new and desire to secure by Letters-Patent:—

1. An overshoe comprising a plurality of movably connected links intervening between the hoof and the ground.

2. In overshoes, a tread comprising a plurality of movable links and means for holding the links in position relatively to each other.

3. In overshoes, a tread composed of a plurality of metallic links movable relatively to each other.

4. An overshoe comprising a plurality of movable links in catenation intervening between the hoof and the ground.

5. An overshoe having a tread comprising movable links arranged in a plurality of catenations intervening between the hoof and the ground.

6. An overshoe having a tread comprising a plurality of links forming a series of catenations diverging, relatively to each other, from a common locus located centrally of the underside of the hoof.

7. An overshoe having a tread comprising a plurality of links forming a plurality of convergent catenations; and means for holding the convergent ends thereof in position relatively to each other.

8. An overshoe comprising a tread composed of a plurality of movable links, and means for holding the tread in position relatively to the hoof.

9. An overshoe comprising a plurality of metallic links arranged in a series of chain-like formations diverging, relatively to each other, from a common locus located centrally of the underside of the hoof, and means for holding said formations in normal position.

10. In an overshoe, a tread comprising a spaced chain structure, and means for attaching the tread to the hoof.

11. In an overshoe, a tread comprising a spaced chain structure extending across the hoof and over the edge thereof, and means for attaching the tread to the hoof.

12. A removable overshoe comprising a flexible metallic tread provided with a plurality of contacts thereon adapted to frictionally engage with the surface trod upon, and means for holding the tread in position upon the hoof.

13. In an overshoe, a tread comprising a plurality of catenations diverging from the central part of the underside of the hoof, and means for attaching the tread to the hoof.

14. In an overshoe, a tread comprising a spaced chain structure extending across the hoof and over the edge thereof, the portions of the structure diverging from the central part of the hoof, and means for attaching the tread to the hoof.

15. An overshoe comprising a tread of spaced chain construction, means for attaching the tread to the hoof consisting of a band adapted to be secured about the base of the leg, and means connecting the tread and the band.

16. An overshoe, comprising a tread composed of a series of divergent catenations having their convergent ends secured centrally of the underside of the hoof and their divergent ends extended upward upon the wall of the hoof, a band secured around the wall of the hoof and engaging with and supporting the divergent ends of the catenations, a band secured about the base of the leg, and means connecting the two bands and tending to hold the same in normal coöperative relation.

17. An overshoe comprising a spaced chain structure extending across the underside of the hoof, means for attaching it to the hoof consisting of a band adapted to be secured about the base of the leg, means connecting the chain structure and the band, and a shield adapted to be secured between the band and the leg.

18. An overshoe, comprising a tread composed of metallic links arranged in a plurality of catenations, 2, divergent relatively to each other and having their convergent ends engaged with a common means of attachment, 1, located centrally of the underside of the hoof and their divergent ends extended upward over the wall of the hoof, 2, a band secured about the wall of the hoof, 8, ngaging with and supporting the several catenations, 2, at their divergent ends; a band, 9, secured about the base of the leg and coöperating with band 8 by connective means, 7, disposed therebetween; and a shield, 6, enveloping the base of the leg and secured in position thereon under the band 9.

In testimony that I claim the foregoing as my invention I have hereunto signed my name in the presence of the subscribing witnesses, this twenty-second day of March, A. D. 1907.

GEORGE N. KINNELL.

Witnesses:
CHARLES M. WILCOX,
JNO. J. WHITTLESEY.